United States Patent
Niland

(10) Patent No.: US 10,701,432 B2
(45) Date of Patent: Jun. 30, 2020

(54) METHODS AND SYSTEMS FOR PROVIDING A SCALED USER INTERFACE

(71) Applicant: Comcast Cable Communications, LLC, Philadelphia, PA (US)

(72) Inventor: Daniel Niland, Seattle, WA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 99 days.

(21) Appl. No.: 16/115,255

(22) Filed: Aug. 28, 2018

(65) Prior Publication Data
US 2020/0077135 A1    Mar. 5, 2020

(51) Int. Cl.
*H04N 21/431*    (2011.01)
*H04N 21/472*    (2011.01)

(52) U.S. Cl.
CPC ... *H04N 21/4312* (2013.01); *H04N 21/47202* (2013.01); *H04N 21/47217* (2013.01)

(58) Field of Classification Search
CPC ......... H04N 21/4312; H04N 21/47217; H04N 21/47202
See application file for complete search history.

(56) References Cited

U.S. PATENT DOCUMENTS

| | | | |
|---|---|---|---|
| 2006/0048184 A1* | 3/2006 | Poslinski | H04N 5/44543 725/45 |
| 2013/0329109 A1* | 12/2013 | Park | H04N 5/23219 348/333.02 |
| 2016/0034574 A1* | 2/2016 | Kang | G06F 3/0482 715/720 |
| 2018/0012075 A1* | 1/2018 | Okada | G11B 27/102 |

* cited by examiner

*Primary Examiner* — Kunal Langhnoja
(74) *Attorney, Agent, or Firm* — Ballard Spahr LLP

(57) ABSTRACT

Disclosed are methods and systems for providing a scaled user interface. A content player can provide a user interface that enables a user to manage playback (e.g., seek) of the time-based content item. The user can access a first playback direction (e.g., a first playback axis, etc.) associated with the time-based content item and cause a user interface element to be displayed. The user can click/press the user interface element in a continuous action to cause a second playback direction (e.g., a second playback axis, etc.) to be displayed. The second playback direction can be associated with a scale that is different (e.g., less/greater) than a scale associated with the first playback direction.

20 Claims, 7 Drawing Sheets

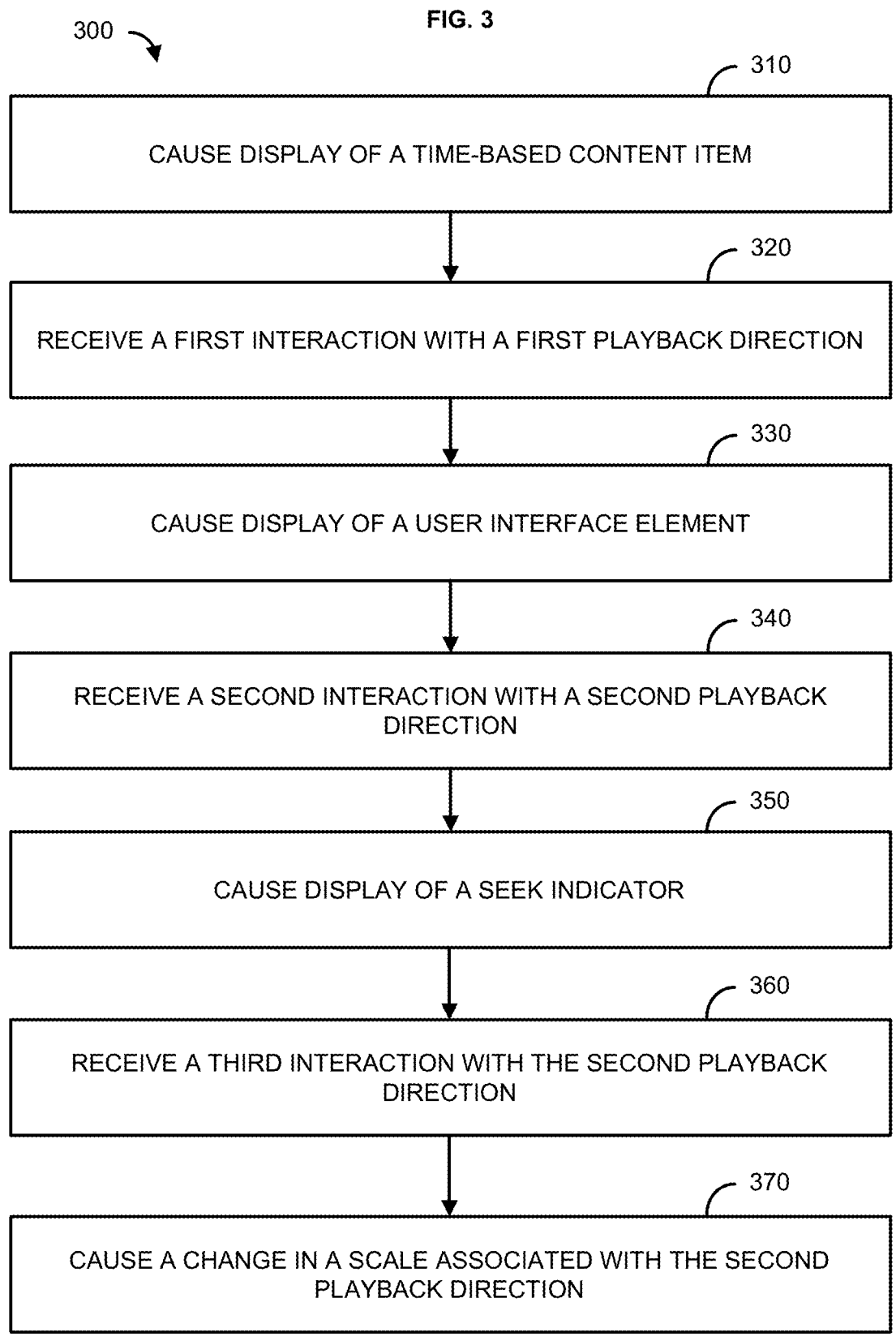

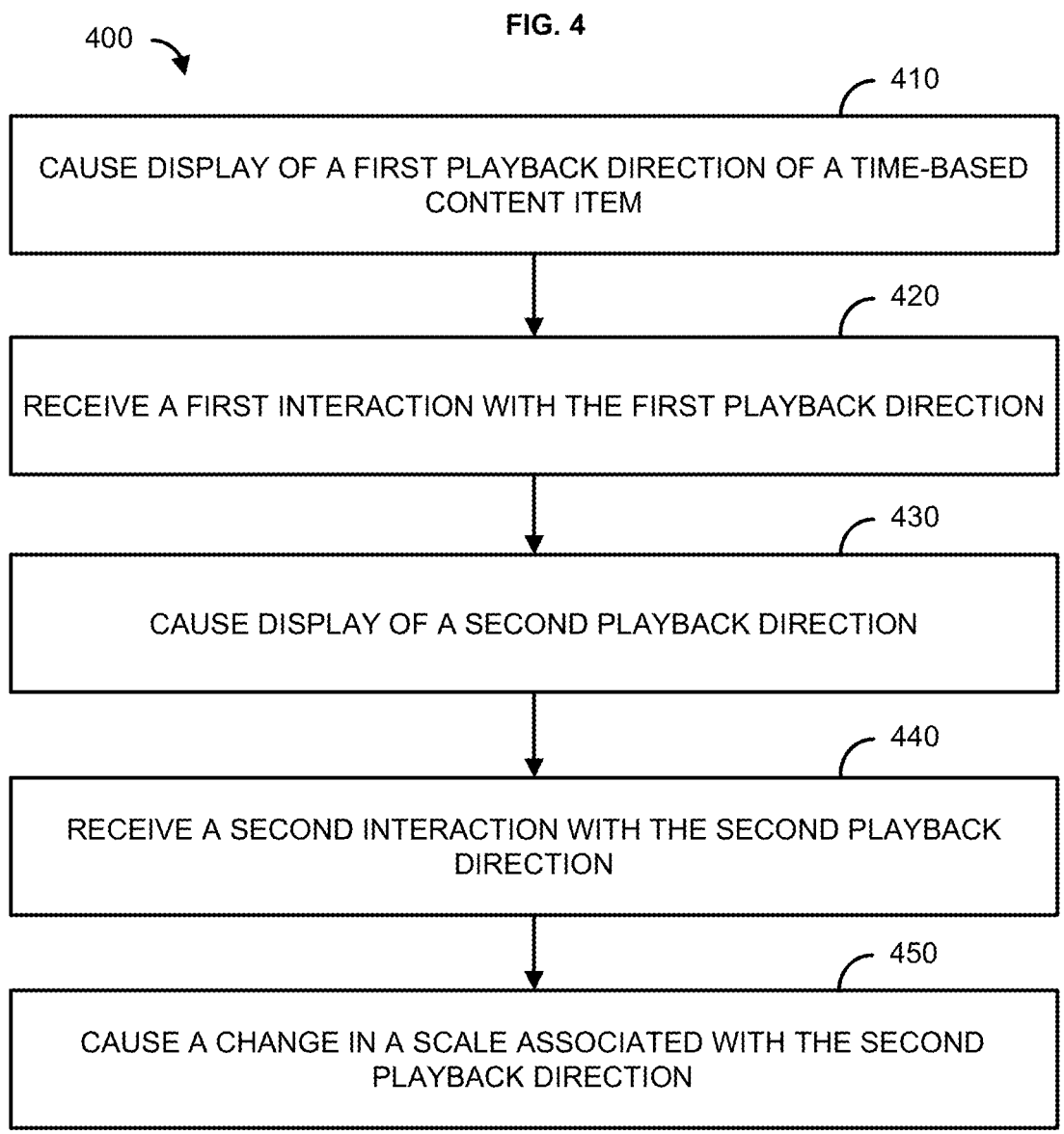

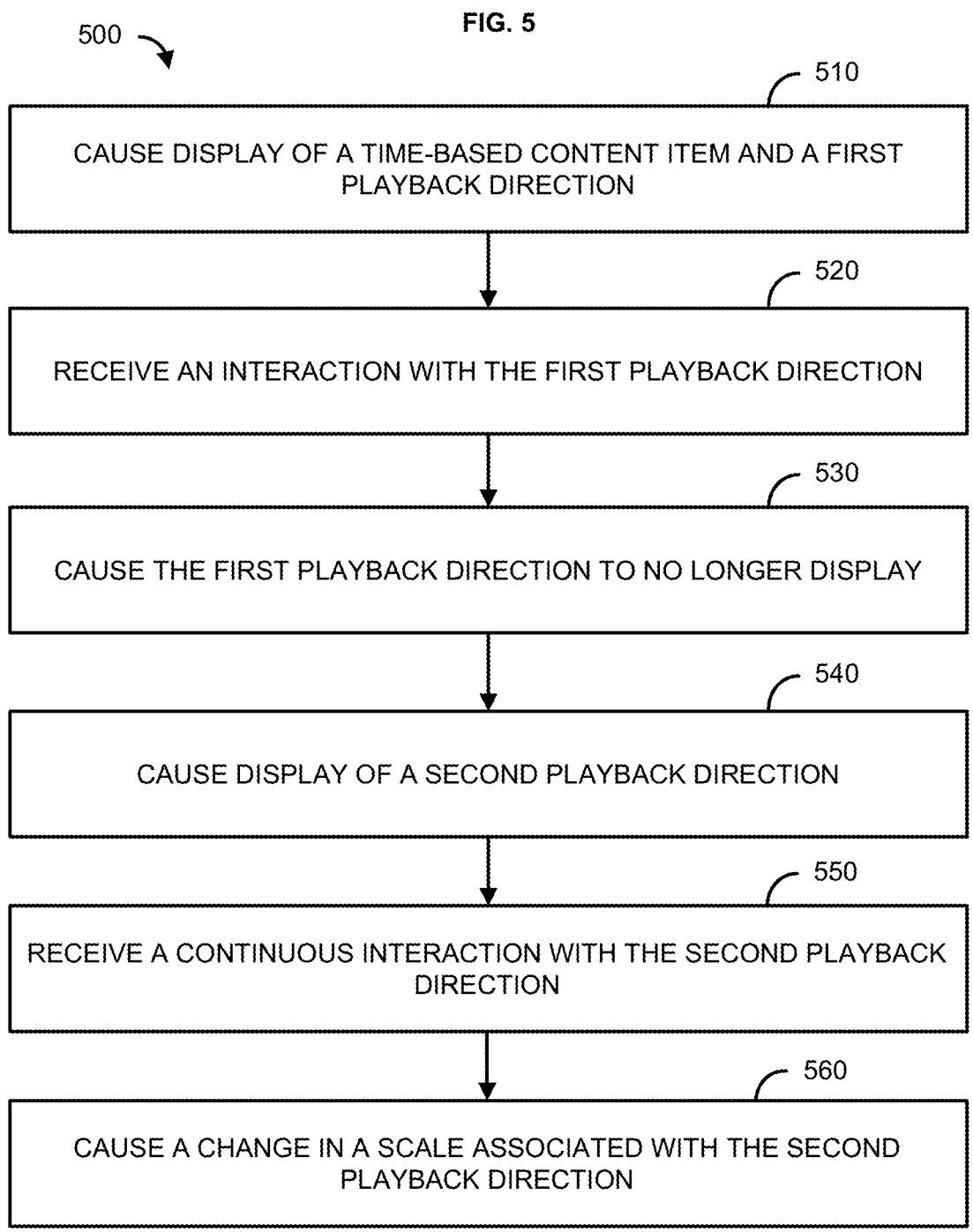

METHODS AND SYSTEMS FOR PROVIDING A SCALED USER INTERFACE

BACKGROUND

While watching a video, a user may want to skip, rewind, or otherwise progress to a point in the video. For a user watching the video, especially a long duration video on a small screen, a seek bar used to skip, rewind, or otherwise progress to a point in the video is often too small or lacks a proper scale to seek a specific point in the video accurately and/or with precision. These and other shortcomings are addressed by the approaches set forth herein.

SUMMARY

It is to be understood that both the following general description and the following detailed description are exemplary and explanatory only and are not restrictive. Provided are methods and systems for providing a scaled user interface. A content player (e.g., set-top box, DVR, video streamer, electronic book reader, mobile device, smart device, etc.) can provide a user interface during playback of a time-based content item such as video or audio, for example. The user interface can enable a user to manage playback (e.g., seek) of the time-based content item. During playback of the time-based content item, a first playback axis (e.g., first playback direction, seek bar, etc.) associated with the time-based content item can be presented as an overlay in the content item. The user can use a mouse and/or finger/stylus to access the first playback axis. A user interface element (e.g., pop-up window) can be displayed for the user to engage/access. For example, responsive to the user accessing the first playback axis, the user interface element (e.g., pop-up window) can be displayed for the user to engage/access.

The user can interact with the user interface element by clicking/pressing the user interface element and continuing the interaction in a direction for a duration of time. A second playback axis (e.g., second playback direction, seek bar, etc.) can be displayed. For example, responsive to the user interacting with the user interface element, the second playback axis can be displayed (e.g., as an overlay in the time-based content item). The second playback axis can be a seek bar with a seek indicator at a position on the second playback axis corresponding to a location where the user clicked on the user interface element. The second playback axis can be associated with a scale that is different from (e.g., less than or greater than) a scale associated with the first playback axis. By moving the seek indicator in a direction along the second playback axis (e.g., seek bar, etc. . . . ), playback of the time-based content item may be advanced/reversed in smaller/finer (or larger/coarser) increments that those associated with the first playback axis.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3 is a flowchart of an example method;

FIG. 4 is a flowchart of an example method;

FIG. 5 is a flowchart of an example method; and

DETAILED DESCRIPTION

Figure 1:
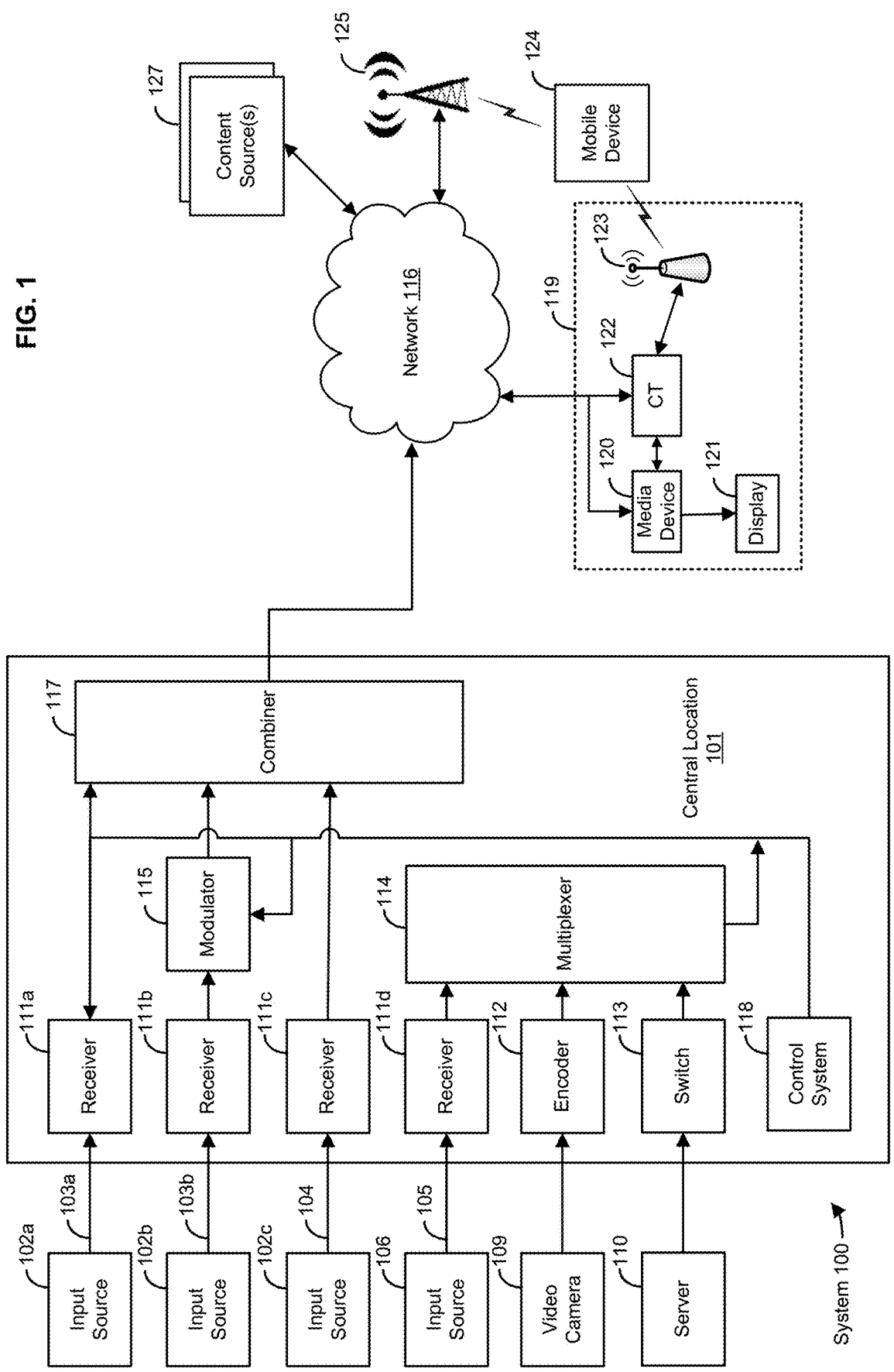
FIG. 1 is a diagram of a system for providing a scale user interface.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects.

Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to methods and systems for providing a scaled seek user interface. A content player (e.g., set-top box, DVR, video streamer, electronic book reader, mobile device, smart device, etc.) can provide a user interface during playback of a content item. The content item can be a time-based content item, such as video and/or audio, for example. The user interface can enable a user to manage playback (e.g., seek) of the time-based content item. The user interface can enable the user to play, pause, forward seek, reverse seek, skip forward, skip back, and the like, the time-based content item. For example, during playback of a time-based content item, a first playback axis (e.g., first playback direction, seek bar, etc.) associated with the time-based content item can be presented as an overlay in the content item (e.g., a playback axis displayed on a display while a video is playing, etc.). The user can access the first playback axis. For example, the user can click on the first playback axis with a mouse control, a button control, and/or a finger/stylus (e.g., for a playback axis displayed via a touch interface, etc.). A user interface element can be displayed. For example, the user interface element can be displayed responsive to the user accessing the first playback axis (e.g., seek bar). The user interface element can be a pop-up window or the like, for example. The user interface element can encourage the user to engage/access the user interface element.

The user interface element can comprise an indication for the user to interact with the user interface element by holding (e.g., clicking, tapping, pressing, etc.) the user interface element and continuing the interaction in a direction for a distance or a duration. For example, the user may be prompted to click the user interface element and hold/drag a mouse/finger upwards for an amount of time (e.g., 1 second, 1 millisecond, etc.) or for a distance (e.g., 1 millimeter, a quarter inch, etc.). A second playback axis can be displayed as an overlay in the time-based content item. The second playback axis can be displayed responsive to the interaction in the direction for the distance or the duration. The second playback axis can be a seek bar with a seek indicator at a position on the second playback axis corresponding to a location where the user clicked on the user interface element.

The second playback axis (e.g., second playback direction, seek bar, etc.) can be associated with a scale that is greater than a scale associated with the first playback axis. For example, the first playback axis can be associated with a scale with 10-second increments, such that the first playback axis comprises indications that are associated with playback instances of the time-based content item that are separated by 10-second time windows. The indications can be directly proportional to the scale associated with the first playback axis. By moving a seek indicator in a direction along the first playback axis (e.g., seek bar), playback of the time-based content item may be advanced/reversed in 10-second increments. The second playback axis (e.g., seek bar) can be associated with a scale with 5-second increments, such that the second playback axis comprises indications that are associated with playback instances of the time-based content item that are separated by 5-second time windows. The indications can be directly proportional to the scale associated with the second playback axis. By moving the seek indicator in a direction along the second playback axis (e.g., seek bar), playback of the time-based content item may be advanced/reversed in 5-second increments. The scale of the second playback axis (e.g., 5-second increments) can be changed based on the interaction in the direction. The scale of the second playback axis (e.g., seek bar) can be changed based on the distance or the duration associated with the interaction in the direction. The scale of the second playback axis can be increased as the distance or the duration associated with the interaction in the direction increases. For example, as the user holds a click of the user interface element and drag the mouse/finger upwards, the scale of the second playback axis can increase from 5-second increments to 2-second increments, from 2-second increments to 1-second increments, from 1-second increments to millisecond increments, so on, and the like. If the direction of the interaction changes, then the scale of the second playback axis can be decreased. For example, as the user holds a click of the user interface element and drag the mouse/finger downwards, the scale of the second playback axis can decrease from millisecond increments to 1-second increments, from 1-second increments to 2-second increments, from 2-second increments to 5-second increments, so on, and the like. The scale of the second playback axis (e.g., seek bar) can change according to any increment.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., time-based content items, video, audio, data, input programming, and the like) from multiple sources. The central location 101 can combine the content from the various sources and can distribute the content to user (e.g., subscriber) locations (e.g., location 119) via a distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. In an aspect, the network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an aspect, the system 100 can comprise one or more content source(s) 127. The content source(s) 127 can be configured to provide content (e.g., time-based content items, video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. In an aspect, the content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

In an aspect, a multitude of users can be connected to the network 116 at one or more of the user locations. The user location 119 can comprise a media device 120. The media device 120 can be a content player configured to play/ playback time-based content, such as video and audio, for example. The media device 120 can demodulate and/or decode, if needed, signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

In an aspect, the communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

In an aspect, the user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

In an aspect, the user location 119 may not be fixed. By way of example, a user can receive content from the network 116 on the mobile device 124. The mobile device 124 can be a content player configured to play/playback time-based content, such as video and audio, for example. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

The system 100 can comprise any number of content players. A content player can be a software application and/or a device such as a set-top box, a DVR, a video streamer, an electronic book reader, a mobile device, a smart device, the media device 120, the mobile device 124, and the like. The content player can be configured to receive an interaction, such as a click, a drag, a touch, a slide, and the like associated with an interface element (e.g., playback axis, pop-up window, etc.). The content player can be configured to receive a signal indicative of the interaction. The content player can be configured to identify the interaction based on the signal. For example, the interaction can be received from the display 121 or from one or more other peripherals (e.g., keyboard, mouse, touchpad, etc.). The content player can be configured to determine a direction of the interaction. The content player can be configured to detect a direction based on a click and drag action associated with a mouse, or the movement of an object (finger, stylus, etc.) across a touch screen (e.g., display 121). For example, the content player can be configured to detect a direction of an interaction (e.g., a click/drag action associated with a mouse, movement of a finger/stylus across a touch screen interface, etc.) during playback of a time-based content item. The time-based content item can be provided by the content source(s) 127.

The content player (e.g., the media device 120, the mobile device 124, etc.) can provide a user interface during playback of the time-based content item. The user interface can enable a user to manage playback (e.g., seek) of the time-based content item. The user interface can enable the user to play, pause, forward seek, reverse seek, skip forward, skip back, and the like the time-based content item. For example, during playback of a time-based content item, a first playback axis (e.g., first playback direction, seek bar, etc.) associated with the time-based content item can be presented as an overlay in the content item (e.g., a playback axis displayed on the display 121 while a video is playing, etc.). The first playback axis can be configured to advance/reverse the time-based content item by a predefined time-based increment. For example, if the user moves a seek indicator in a direction such as right or left, playback of the time-based content item can be either advanced or reverse, respectively, by a predetermined amount of time (e.g., 1 second, 2 seconds, 5 seconds, 10 seconds, etc.) based on the direction that the seek indicator is moved.

The user may desire to advance/reverse playback of the time-based content item at a different rate/scale than associated with the first playback axis (e.g., first playback direction, seek bar, etc.). For example, the user may desire to advance/reverse playback of the time-based content item in 5-second increments, or, even finer, by 1-second increments. To do so, the user can access the first playback axis. For example, the user can click on the first playback axis with a mouse control, a button control, and/or a finger/stylus (e.g., for a playback axis displayed via a touch interface associated with the mobile device 124, etc.). The content player can cause a user interface element to be displayed. For example, the user interface element can be displayed responsive to the user accessing the first playback axis. The user interface element can be a pop-up window or the like, for example. The user interface element can encourage the user to engage/access the user interface element. For example, the user interface element can encourage the user to engage/access the user interface element by displaying an arrow pointing in a direction. In an aspect, the user interface element may not display. Instead, the user can click on the first playback axis with a mouse control, a button control, and/or a finger/stylus. The first playback axis can no longer be displayed and a second playback axis (e.g., second playback direction, seek bar, etc.) can be displayed. For example, responsive to the user clicking on the first playback axis with the mouse control, the button control, and/or the finger/stylus, the first playback axis (e.g., first playback direction, seek bar, etc.) can no longer be displayed and a second playback axis can be displayed.

When the user interface element is displayed, the user interface element can comprise an indication for the user to interact with the user interface element by holding (e.g., clicking, tapping, pressing, etc.) the user interface element and continuing the interaction in a direction for a distance or a duration. For example, the user may be prompted (e.g., prompted by a displayed arrow, etc.) to click the user interface element and drag a mouse/finger upwards for an amount of time (e.g., 1 second, 1 milliseconds, etc.) or for a distance (e.g., 1 millimeter, a quarter inch, etc.). A second playback axis (e.g., second playback direction, seek bar, etc.) can be displayed as an overlay in the time-based content item. The second playback axis can be displayed responsive to the interaction (e.g., click and drag of a mouse, tap and slide of a finger, etc.) in the direction. The second playback axis can be a seek bar with a seek indicator at a position on the second playback axis corresponding to a location where the user clicked/tapped/pressed on the user interface element.

The second playback axis (e.g., second playback direction, seek bar, etc.) can be associated with a scale that is different from (e.g., less than or greater than) a scale associated with the first playback axis (e.g., first playback direction, seek bar, etc.). For example, the first playback axis can be associated with a scale with 10-second increments. The first playback axis can comprise indications that are associated with playback instances of the time-based content item that are separated by 10-second time windows. The indications can be directly proportional to the scale associated with the first playback axis. In an aspect, the first playback axis may not comprise indications that are associated with playback instances of the time-based content item, but the first playback axis can still be associated with predefined increments (e.g., 10-seconds, etc.). By moving a seek indicator in a direction along the first playback axis, playback of the time-based content item may be advanced/reversed in 10-second increments. The second playback axis (e.g., second playback direction, seek bar, etc.) can be associated with a scale with 5-second increments, such that the second playback axis comprises indications that are associated with playback instances of the time-based content item that are separated by 5-second time windows. The indications can be directly proportional to the scale associated with the second playback axis (e.g., seek bar). By moving the seek indicator in a direction along the second playback axis, playback of the time-based content item may be advanced/reversed in 5-second increments. The scale of the second playback axis (e.g., 5-second increments) can be changed based on the interaction in the direction. The scale of the second playback axis can be changed based on the distance or the duration associated with the interaction in the direction. The scale of the second playback axis can be increased as the distance or the duration associated with the interaction in the direction increases. For example, as the user holds a click of the user interface element (or the second playback axis if the user interface element is not displayed) and drag the mouse/finger upwards, the scale of the second playback axis (e.g., seek bar) can increase from 5-second increments to 2-second increments, from 2-second increments to 1-second increments, from 1-second increments to millisecond increments, so on, and the like. If the direction of the interaction changes, then the scale of the second playback axis (e.g., seek bar) can be decreased. For example, as the user holds a click of the user interface element (or the second playback axis if the user interface element is not displayed) and drag the mouse/finger downwards, the scale of the second playback axis can decrease from millisecond increments to 1-second increments, from 1-second increments to 2-second increments, from 2-second increments to 5-second increments, so on, and the like. The scale of the second playback axis (e.g., second playback direction, seek bar, etc.) can change according to any increment.

Figure 2A:
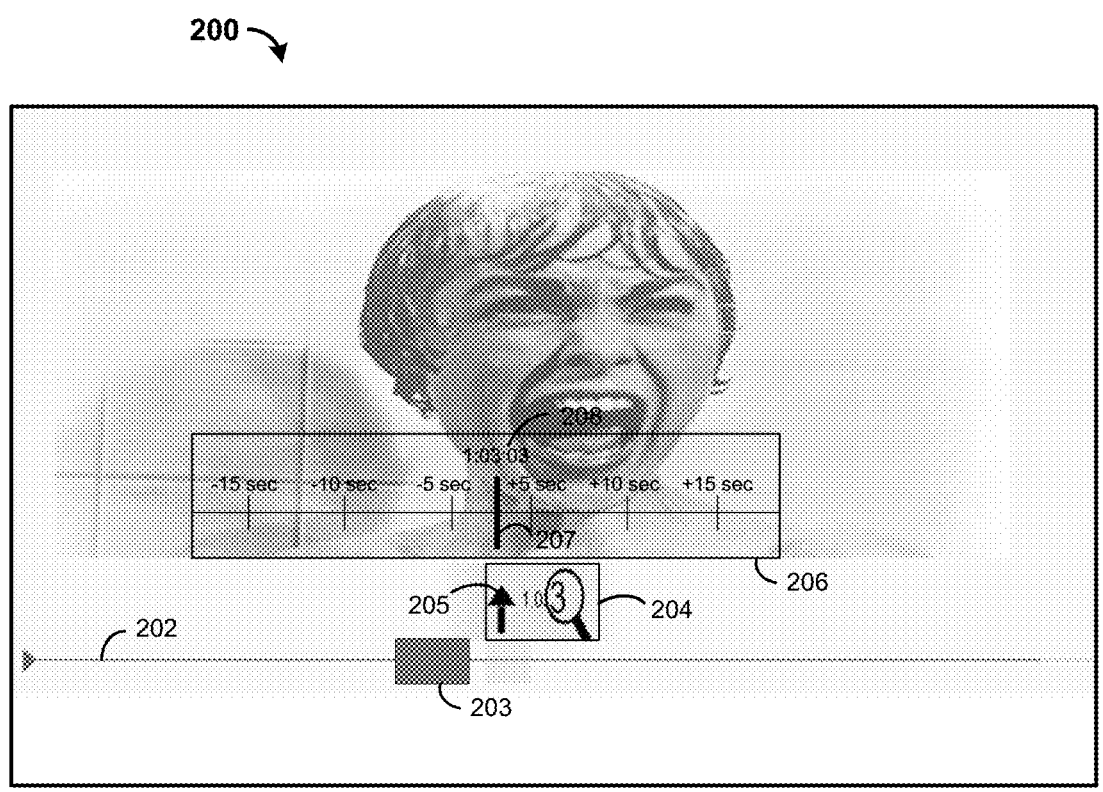
FIG. 2A is a diagram of a user interface.

FIG. 2A is a diagram of an example interface 200 for providing a scaled seek user interface. The interface 200 can enable a user to manage playback (e.g., seek) of a time-based content item 201. The time-based content item 201 can be a video, such as a movie, for example. The user interface can enable the user to play, pause, forward seek, reverse seek, skip forward, skip back, and the like the time-based content item 201. During playback of the time-based content item 201, a first playback axis 202 associated with the time-based content item 201 can be presented as an overlay in the time-based content item 201. The first playback axis 202 can be configured to advance/reverse the time-based content item 201 by a predefined time-based increment. For example, if the user moves a seek indicator 203 in a direction such as right or left, playback of the time-based content item 201 can be either advanced or reverse, respectively, by a predetermined amount of time (e.g., 1, second, 2, seconds, 5-seconds, 10 seconds, etc.) based on the direction that the seek indicator 203 is moved.

The user can advance/reverse playback of the time-based content item 201 at a different rate/scale than associated with the first playback axis 202. The user can access the first playback axis 202. To access the first playback axis 202 the user can click on the first playback axis 202 with a mouse control, a button control, and/or a finger/stylus. A user interface element 204 can be displayed responsive to the user accessing the first playback axis 202. The user interface element 204 can encourage the user to engage/access the user interface element 204 by displaying an arrow 205 pointing in a direction (e.g., upward).

The user can interact with the user interface element 204 by clicking/tapping/pressing the user interface element 204 (e.g., with a mouse, finger, etc.) and continuing the interaction in a direction (e.g., in the direction of the arrow 205) for a distance or a duration. The user can click the user interface element 204 and drag a mouse/finger upwards for an amount of time (e.g., 1 second, 1 milliseconds, duration, etc.) or for a distance (e.g., 1 millimeter, a quarter inch, etc.). For example, the user can clicking/tapping/pressing the user interface element 204 and drag the mouse/finger upwards. In an aspect, the user interface element may not display. Instead, the user can click on the first playback axis with a mouse control, a button control, and/or a finger/stylus. The first playback axis can no longer be displayed (e.g., be hidden) and a second playback axis (e.g., the second playback axis 206) can be displayed. For example, responsive to the user clicking on the first playback axis with the mouse control, the button control, and/or the finger/stylus, the first playback axis can no longer be displayed (e.g., be hidden) and the second playback axis (e.g., the second playback axis 206) can be displayed.

The second playback axis 206 can be a seek bar displayed as an overlay in the time-based content item 201. The second playback axis can comprise a seek indicator 207 that is at a position on the second playback axis 206 (e.g., seek bar) that is associated with a playback instance of the time-based content item 201. The playback instance of the time-based content item 201 can be at a time 208 associated with the time-based content item 201.

The second playback axis 206 (e.g., seek bar) can be associated with a scale that is different from (e.g., less than or greater than) a scale associated with the first playback axis 202. For example, the first playback axis 202 can be associated with a scale with 10-second increments. By moving the seek indicator 203 in a direction along the first playback axis 202, playback of the time-based content item 201 may be advanced/reversed in 10-second increments. The second playback axis 206 (e.g., seek bar) can be associated with a scale with 5-second increments. The second playback axis 206 can comprise indications that are associated with playback instances of the time-based content item 201 that are separated by 5-second time windows. The indications can be directly proportional to the scale associated with the second playback axis 206. By moving the seek indicator 207 in a direction along the second playback axis 206 (e.g., seek bar), playback of the time-based content item 201 can be advanced/reversed in 5-second increments.

Figure 2B:
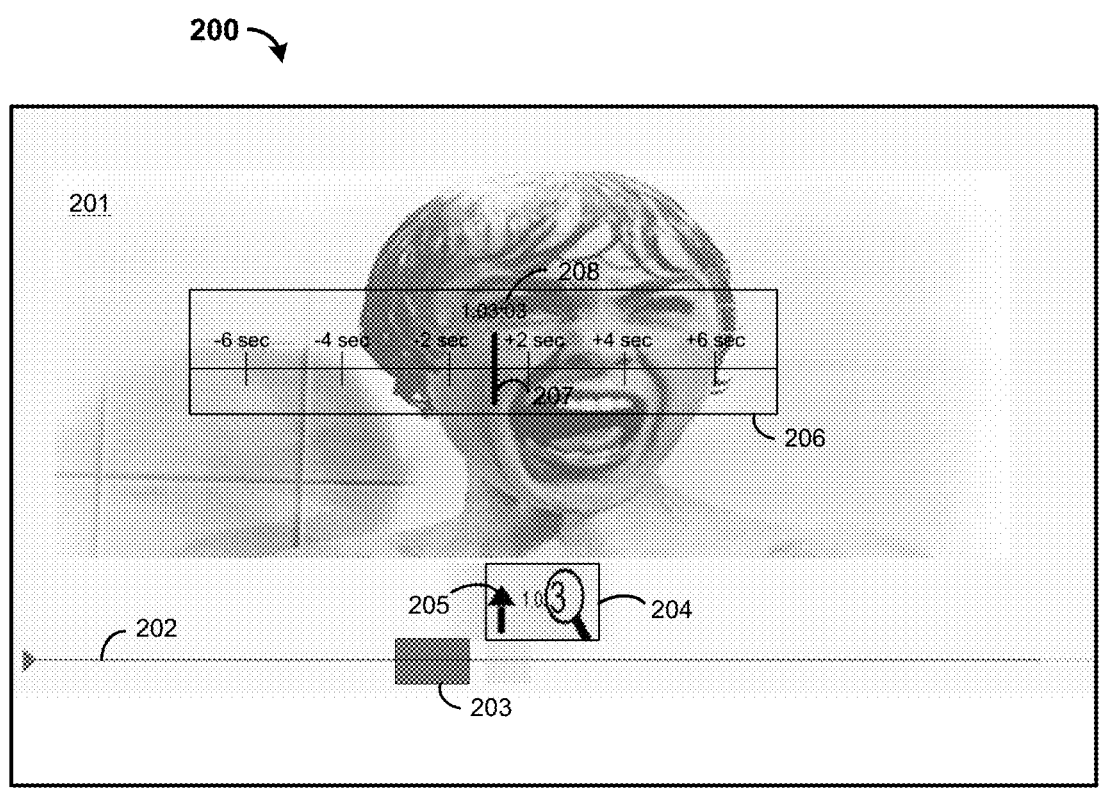
FIG. 2B is a diagram of a user interface.

The scale of the second playback axis 206 (e.g., 5-second increments) can be changed based on the interaction in the direction. For example, the scale of the second playback axis 206 (e.g., seek bar) can be changed based on the distance or duration associated with the interaction in the direction. FIG. 2B is a diagram of the example interface 200 for providing a scaled seek user interface where the scale of the second playback axis 206 (e.g., seek bar) has been increased as the distance or the duration associated with the interaction in the direction increased. For example, as the holds a click of the user interface element 204 (or the second playback axis 206 if the user interface element is not displayed) and drags the mouse/finger upwards, the scale of the second playback axis 206 can be changed/increased from 5-second increments to 2-second increments. In an aspect, the position that the second playback axis 206 (e.g., seek bar) is displayed in the time-based content item can correspond to the distance or the duration of the interaction. For example, as the user drags the mouse upwards, the position of the second playback axis 206 can also move up in the display of the time-based content item 201. The scale of the second playback axis 206 can change to any increment, such as from 5-second increments to 2-second increments, from 2-second increments to 1-second increments, from 1-second increments to millisecond increments, so on, and the like. If the direction of the interaction changes, then the scale of the second playback axis 206 can change/decrease. For example, as the user holds a click of the user interface element 204 (or the second playback axis 206 if the user interface element is not displayed) and drags the mouse/finger downwards, the scale of the second playback axis 201 can change/decrease from millisecond increments to 1-second increments, from 1-second increments to 2-second increments, from 2-second increments to 5-second increments, so on, and the like. The scale of the second playback axis 206 (e.g., seek bar) can change according to any increment.

FIG. 3 is a flowchart of an example method 300 for providing a scaled seek user interface. A time-based content item can be video, audio, a combination thereof, and the like. At 310, a time-based content item can be displayed. For example, a content player (e.g., a set-top box, a DVR, a video streamer, an electronic book reader, a smart device, a computing device, the media device 120, the mobile device 124, etc.) can display and/or cause display (e.g., transmit a signal that cause display, etc.) of the time-based content. The time-based content can be displayed, during playback, by a display device, such as the display 121, for example.

At 320 a content player can receive a signal indicating a first interaction with a first playback axis (e.g., first playback direction, seek bar, etc.) associated with a time-based content item. The content play can receive the signal indicating the first interaction with the first playback axis (e.g., first playback direction, seek bar, etc.) during playback of the time-based content item. The time-based content item can comprise a plurality of segments. Each segment of the plurality of segments can be associated with a playback time instance of a plurality of playback time instances. A selection of a playback time instance can cause playback of the time-based content item. During playback of the time-based content item the first playback axis can be presented as an overlay in the time-based content item. The first playback axis can be configured to advance/reverse the time-based content item by a predefined time-based increment. For example, if the user moves a seek indicator in a direction such as right or left, playback of the time-based content item can be either advanced or reverse, respectively, by a predetermined amount of time (e.g., 1, second, 2, seconds, 5-seconds, 10 seconds, etc.) based on the direction that the seek indicator is moved. To advance/reverse playback of the time-based content item in time-based increments different than provided by the first playback axis (e.g., first playback direction, seek bar, etc.), the user can access the first playback axis. The first interaction can be a user accessing the first playback axis. The first interaction can be the user using a mouse associated with the content player to click on the first playback axis (e.g., first playback direction, seek bar, etc.). The first interaction can be the user using a finger of stylus on a touch interface associated with the content player to click/tap/press the first playback axis.

At 330, the content player can cause display (e.g., displayed via the display 121, a display device, etc.) of a user interface element. The content player can cause display of a user interface responsive to the first interaction. The user interface element can be a pop-up window, and/or the like, for example. The user interface element can encourage the user to engage/access the user interface element. For example, the user interface element can display an arrow pointing in a direction (e.g., upward). The user can interact with the user interface element.

At 340, the content player can receive a signal indicating a second interaction. The content player can receive the signal indicating the second interaction responsive to causing display of the user interface element. The second interaction can be associated with the user interface element. For example, the second interaction can comprise the user clicking/tapping/pressing the user interface element (e.g., user interface element 204) and dragging the mouse/finger in a direction (e.g., upwards).

At 350, the content player can cause display (e.g., displayed via the display 121, a display device, etc.) of a second playback axis (e.g., second playback direction, seek bar, etc.). The content player can cause display of the second playback axis responsive to the second interaction. For example, the second playback axis can be a seek bar with a seek indicator at a position on the seek bar corresponding to a location where the user clicked/tapped/pressed on the user interface element. The seek indicator can be at a playback time instance of a plurality of playback time instances indicated on the second playback axis (e.g., second playback direction, seek bar, etc.). A plurality of time windows can each separate a playback time instance of the plurality of playback time instances. The second playback axis can be associated with a scale that is different from (e.g., less than or greater than) a scale associated with the first playback axis (e.g., first playback direction, seek bar, etc.). For example, the first playback axis can be associated with a scale with 10-second increments. By moving a seek indicator associated with the first playback axis in a direction along the first playback axis, playback of the time-based content item can be advanced/reversed in 10-second increments. The second playback axis (e.g., second playback direction, seek bar, etc.) can be associated with a different scale. For example, the second playback axis can be associated with a scale with 5-second increments. The second playback axis can comprise indications that are associated with playback instances of the time-based content item that are separated by 5-second time windows. The indications can be directly proportional to the scale associated with the second playback axis. By moving the seek indicator associated with the second playback axis in a direction along the second playback axis (e.g., second playback direction, seek bar, etc.), playback of the time-based content item can be advanced/reversed in 5-second increments. The first playback axis (e.g., first playback direction, seek bar, etc.) and the second playback axis (e.g., second playback direction, seek bar, etc.) can be associated with a scale of any increments.

At 360, the content player can receive a signal indicating a third interaction. The third interaction can comprise a continuous access of the user element and/or second playback axis (e.g., second playback direction, seek bar, etc.) in a direction. The third interaction can be the user using a mouse associated with the content player to click on the user interface element and/or second playback axis (e.g., seek bar) and drag the mouse in a direction (e.g., upward, etc.). The third interaction can be the user using a finger of stylus on a touch interface associated with the content player to click/tap/press the user interface element and drag the finger/stylus in a direction (e.g., upward, etc.).

At 370, the content player can cause a change in the scale associated with the time-based content item. The content player can cause a decrease in a quantity of time associated with each time window associated with the increments of the scale associate with the second playback axis (e.g., second playback direction, seek bar, etc.). The scale of the second playback axis (e.g., 5-second increments) can be changed based on the third interaction. The scale of the second playback axis can be changed based on a continuous access (e.g., access for a distance, access for a duration, etc.) associated with the third interaction. For example, the scale of the second playback axis (e.g., second playback direction, seek bar, etc.) can be increased as the distance or the duration (e.g., continuous access) associated with the third interaction increases. For example, as the user holds a click of the user interface element (or second playback axis) and drags the mouse/finger upwards, the scale of the second playback axis (e.g., second playback direction, seek bar, etc.) can increase from 5-second increments to 2-second increments, from 2-second increments to 1-second increments, from 1-second increments to millisecond increments, so on, and the like. If the direction of the interaction changes, then the scale of the second playback axis can be decreased. For example, as the user holds a click of the user interface element (or second playback axis) and drags the mouse/finger downwards, the scale of the second playback axis can decrease from millisecond increments to 1-second increments, from 1-second increments to 2-second increments, from 2-second increments to 5-second increments, so on, and the like.

The scale of the second playback axis (e.g., second playback direction, seek bar, etc.) can be adjusted based on an interaction. The second playback axis can be scaled based on a user preference (e.g., 1-second increments, 2-second increments, 5-second increments, etc.), and the seek indicator associated with the second playback axis can be moved in a direction along the second playback axis (e.g., seek bar). Playback of the time-based content item can correspond to the location of the seek indicator along the second playback axis. For example, an indication on the second playback axis can be used to find a playback instance of the time-based content item (e.g., point in a video). Moving the seek indicator to a location along the second playback axis indicated as "1:25" can correspond to playback of the time-based content item starting at a 1 hour and 25 minute duration of the time-based content item. Further, if the seek indicator is moved to a location along the second playback axis indicated as "2:35", then playback of the time-based content item can occur at a 2 hour and 35 minute duration of the time-based content item. Playback of the time-based content item can correspond to any playback instance of the time-based content item indicated on the second playback axis. For example, a user watching video can access the second playback axis and move the seek indicator to a point indicated on the second playback axis (e.g., a 1:25) and the video can start/resume at a point 1 hour and 25 minutes into the video. To start/resume a time-based content item (e.g., video, audio, etc.) at a point indicated on the second playback axis, a device, such as a device configured to display the second playback axis (e.g., a content player, the display device 121, the media device 120, the mobile device 124, etc.) and/or a device configured to cause display of the second playback axis (e.g., a content player, the media device 120, the mobile device 124, etc.) can access a content source (e.g., content source(s) 127, network-based content source, streaming content source, etc.) and/or storage location (e.g., media file, data file, database, digital optical disc, compact disc, etc.) associated with the time-based content item. For example, a user watching a time-based content item (e.g., video) can access the second playback axis, move the seek indicator to a point indicated on the second playback axis (e.g., a 1:25), and a signal can be generated that causes a content player to associate, request, and/or retrieve one or more manifest files associated with the time-based content item to from a content source. The one or more manifest files can comprise one or more indicators (e.g., metadata, watermarks, etc.) associated with the point indicated on the second playback axis that cause the time-based content item to start/resume at a point 1 hour and 25 minutes into the time-based content. As another example, a user watching a time-based content item (e.g., video) can access the second playback axis, move the seek indicator to a point indicated on the second playback axis (e.g., a 1:25), and a signal can be generated that causes a content player to decode an encoded file associated with the time-based content item. The content player can decode a portion of the encoded file that is associated with the point indicated on the second playback axis (e.g., a 1:25). The file can be associated with the point indicated on the second playback axis via metadata, resource indicators, or any other suitable/similar means. Decoding the portion of the encoded file can cause the time-based content item to start/resume at a point 1 hour and 25 minutes into the time-based content. In an aspect, a time-based content item can start/resume at a point indicated on the second playback axis by any known or related method/means.

FIG. 4 is a flowchart of an example method 400 for providing a scaled seek user interface. A time-based content item can be video, audio, a combination thereof, and the like. At 410, a time-based content item can be displayed. For example, a content player (e.g., a set-top box, a DVR, a video streamer, an electronic book reader, a smart device, a computing device, the media device 120, the mobile device 124, etc.) can display and/or cause display (e.g., transmit a signal that cause display, etc.) of the time-based content. The time-based content can be displayed, during playback, by a display device, such as the display 121, for example.

At 420 the content player can receive a signal indicating a first interaction with a first playback axis (e.g., first playback direction, seek bar, etc.)associated with a time-based content item. The content play can receive the signal indicating the first interaction with the first playback axis (e.g., first playback direction, seek bar, etc.) during playback of the time-based content item. The time-based content item can comprise a plurality of segments. Each segment of the plurality of segments can be associated with a playback time instance of a plurality of playback time instances. A selection of a playback time instance can cause playback of the time-based content item. During playback of the time-based content item the first playback axis can be presented as an overlay in the time-based content item. The first playback axis can be configured to advance/reverse the time-based content item by a predefined time-based increment. For example, if the user moves a seek indicator in a direction such as right or left, playback of the time-based content item can be either advanced or reverse, respectively, by a predetermined amount of time (e.g., 1, second, 2, seconds, 5-seconds, 10 seconds, etc.) based on the direction that the seek indicator is moved. To advance/reverse playback of the time-based content item in time-based increments different than provided by the first playback axis, the user can access the first playback axis. The first interaction can be a user accessing the first playback axis. The first interaction can be the user using a mouse associated with the content player to click on the first playback axis. The first interaction can be the user using a finger of stylus on a touch interface associated with the content player to click/tap/press the first playback axis (e.g., first playback direction, seek bar, etc.).

At 430, the content player can cause display (e.g., displayed via the display 121, a display device, etc.) of a second playback axis (e.g., second playback direction, seek bar, etc.). The content player can cause display of the second playback axis responsive to the first interaction. For example, the second playback axis can be a seek bar with a seek indicator at a position on the seek bar corresponding to a location where the user clicked/tapped/pressed on the user interface element. The seek indicator can be at a playback time instance of a plurality of playback time instances indicated on the second playback axis (e.g., second playback direction, seek bar, etc.). A plurality of time windows can each separate a playback time instance of the plurality of playback time instances. The second playback axis can be associated with a scale that is different than a scale associated with the first playback axis (e.g., first playback direction, seek bar, etc.). For example, the first playback axis can be associated with a scale with 10-second increments. By moving a seek indicator associated with the first playback axis in a direction along the first playback axis (e.g., first playback direction, seek bar, etc.), playback of the time-based content item can be advanced/reversed in 10-second increments. The second playback axis (e.g., seek bar) can be associated with a different scale. For example, the second playback axis can be associated with a scale with 5-second increments. The second playback axis can comprise indications that are associated with playback instances of the time-based content item that are separated by 5-second time windows. The indications can be directly proportional to the scale associated with the second playback axis. By moving the seek indicator associated with the second playback axis in a direction along the second playback axis (e.g., seek bar), playback of the time-based content item can be advanced/reversed in 5-second increments. The first playback axis and the second playback axis can be associated with a scale of any increments.

At 440, the content player can receive a signal indicating a second interaction. The second interaction can comprise a continuous access of the second playback axis (e.g., second playback direction, seek bar, etc.) in a direction. The second interaction can be the user using a mouse associated with the content player to click on the second playback axis and drag the mouse in a direction (e.g., upward, etc.). The second interaction can be the user using a finger of stylus on a touch interface associated with the content player to click/tap/press the second playback axis and drag the finger/stylus in a direction (e.g., upward, etc.).

At 450, the content player can cause a change in the scale associated with the second playback axis/time-based content item. The content player can cause a decrease in a quantity of time associated with each time window associated with the increments of the scale associate with the second playback axis (e.g., second playback direction, seek bar, etc.). The scale of the second playback axis (e.g., 5-second increments) can be changed based on the second interaction. The scale of the second playback axis can be changed based on a continuous access (e.g., access for a distance, access for a duration, etc.) associated with the second interaction. For example, the scale of the second playback axis can be increased as the distance or the duration (e.g., continuous access) associated with the second interaction increases. For example, as the user continues to click the user interface element (or second playback axis) and drag the mouse/finger upwards, the scale of the second playback axis (e.g., seek bar) can increase from 5-second increments to 2-second increments, from 2-second increments to 1-second increments, from 1-second increments to millisecond increments, so on, and the like. If the direction of the interaction changes (e.g., changes to an opposite direction, changes from an upward direction to a downward direction, etc.), then the scale of the second playback axis can be decreased. For example, as the user continues to click the user interface element (or second playback axis) and drag the mouse/finger downwards, the scale of the second playback axis can decrease from millisecond increments to 1-second increments, from 1-second increments to 2-second increments, from 2-second increments to 5-second increments, so on, and the like.

The scale of the second playback axis can be adjusted based on an interaction. The second playback axis (e.g., second playback direction, seek bar, etc.) can be scaled based on a user preference (e.g., 1-second increments, 2-second increments, 5-second increments, etc.), and the seek indicator associated with the second playback axis can be moved in a direction along the second playback axis (e.g., seek bar). Playback of the time-based content item can correspond to the location of the seek indicator along the second playback axis. For example, an indication on the second playback axis can be used to find a playback instance of the time-based content item (e.g., point in a video). Moving the seek indicator to a location along the second playback axis indicated as "1:25" can correspond to playback of the time-based content item starting at a 1 hour and 25 minute duration of the time-based content item. Further, if the seek indicator is moved to a location along the second playback axis indicated as "2:35", then playback of the time-based content item can occur at a 2 hour and 35 minute duration of the time-based content item. Playback of the time-based content item can correspond to any playback instance of the time-based content item indicated on the second playback axis. For example, a user watching video can access the second playback axis and move the seek indicator to a point indicated on the second playback axis (e.g., a 1:25) and the video can start/resume at a point 1 hour and 25 minutes into the video. To start/resume a time-based content item (e.g., video, audio, etc.) at a point indicated on the second playback axis, a device, such as a device configured to display the second playback axis (e.g., a content player, the display device 121, the media device 120, the mobile device 124, etc.) and/or a device configured to cause display of the second playback axis (e.g., a content player, the media device 120, the mobile device 124, etc.) can access a content source (e.g., content source(s) 127, network-based content source, streaming content source, etc.) and/or storage location (e.g., media file, data file, database, digital optical disc, compact disc, etc.) associated with the time-based content item. For example, a user watching a time-based content item (e.g., video) can access the second playback axis, move the seek indicator to a point indicated on the second playback axis (e.g., a 1:25), and a signal can be generated that causes a content player to associate, request, and/or retrieve one or more manifest files associated with the time-based content item to from a content source. The one or more manifest files can comprise one or more indicators (e.g., metadata, watermarks, etc.) associated with the point indicated on the second playback axis that cause the time-based content item to start/resume at a point 1 hour and 25 minutes into the time-based content. As another example, a user watching a time-based content item (e.g., video) can access the second playback axis, move the seek indicator to a point indicated on the second playback axis (e.g., a 1:25), and a signal can be generated that causes a content player to decode an encoded file associated with the time-based content item. The content player can decode a portion of the encoded file that is associated with the point indicated on the second playback axis (e.g., a 1:25). The file can be associated with the point indicated on the second playback axis via metadata, resource indicators, or any other suitable/similar means. Decoding the portion of the encoded file can cause the time-based content item to start/resume at a point 1 hour and 25 minutes into the time-based content. In an aspect, a time-based content item can start/resume at a point indicated on the second playback axis by any known or related method/means.

FIG. 5 is a flowchart of an example method 500 for providing a scaled seek user interface. A time-based content item can be video, audio, a combination thereof, and the like. At 510, a time-based content item can be displayed. For example, a content player (e.g., a set-top box, a DVR, a video streamer, an electronic book reader, a smart device, a computing device, the media device 120, the mobile device 124, etc.) can display and/or cause display (e.g., transmit a signal that cause display, etc.) of the time-based content. The time-based content can be displayed, during playback, by a display device, such as the display 121, for example.

At 520 the content player can receive a signal indicating a first interaction with a first playback axis (e.g., first playback direction, seek bar, etc.) associated with a time-based content item. The content play can receive the signal indicating the first interaction with the first playback axis during playback of the time-based content item. The time-based content item can comprise a plurality of segments. Each segment of the plurality of segments can be associated with a playback time instance of a plurality of playback time instances. A selection of a playback time instance can cause playback of the time-based content item. During playback of the time-based content item the first playback axis (e.g., first playback direction, seek bar, etc.) can be presented as an overlay in the time-based content item. The first playback axis can be configured to advance/reverse the time-based content item by a predefined time-based increment. For example, if the user moves a seek indicator in a direction such as right or left, playback of the time-based content item can be either advanced or reverse, respectively, by a predetermined amount of time (e.g., 1, second, 2, seconds, 5-seconds, 10 seconds, etc.) based on the direction that the seek indicator is moved. To advance/reverse playback of the time-based content item in time-based increments different than provided by the first playback axis, the user can access the first playback axis. The first interaction can be a user accessing the first playback axis. The first interaction can be the user using a mouse associated with the content player to click on the first playback axis. The first interaction can be the user using a finger of stylus on a touch interface associated with the content player to click/tap/press the first playback axis (e.g., first playback direction, seek bar, etc.).

At 530, the content player can cause the first playback axis (e.g., first playback direction, seek bar, etc.) to no longer be displayed (e.g., no longer displayed via the display 121, no longer displayed via a display device, etc.). The content player can cause the first playback axis to no longer be displayed responsive to the first interaction.

At 540, the content player can cause display (e.g., displayed via the display 121, a display device, etc.) of a second playback axis. The content player can cause display of the second playback axis (e.g., second playback direction, seek bar, etc.) responsive to no longer causing display of the first playback axis (e.g., second playback direction, seek bar, etc.). For example, the second playback axis can be a seek bar with a seek indicator at a position on the seek bar corresponding to a location where the user clicked/tapped/pressed on the first playback axis. The second playback axis (e.g., second playback direction, seek bar, etc.) can comprise a plurality of indications each associated with a playback time instance of a plurality of playback time instances associated with the time-based content. A plurality of time windows each separate a playback time instance of the plurality of playback time instances. The second playback axis can comprise a seek indicator at a playback time instance of the plurality of playback time instances indicated on the second playback axis. The second playback axis (e.g., seek bar) can be associated with a scale that is different than a scale associated with the first playback axis (e.g., second playback direction, seek bar, etc.). For example, the first playback axis can be associated with a scale with 10-second increments. By moving the seek indicator associated with the first playback axis in a direction along the first playback axis, playback of the time-based content item can be advanced/reversed in 10-second increments. The second playback axis (e.g., second playback direction, seek bar, etc.) can be associated with a different scale. For example, the second playback axis can be associated with a scale with 5-second increments. The second playback axis can comprise indications that are associated with playback instances of the time-based content item that are separated by 5-second time windows. The indications can be directly proportional to the scale associated with the second playback axis. By moving the seek indicator associated with the second playback axis in a direction along the second playback axis, playback of the time-based content item can be advanced/reversed in 5-second increments. The first playback axis and the second playback axis can be associated with a scale of any increments.

At 550, the content player can receive a signal indicating a second interaction. The second interaction can comprise a continuous access of the second playback axis (e.g., second playback direction, seek bar, etc.) in a direction. The second interaction can be the user using a mouse associated with the content player to click on the second playback axis (e.g., second playback direction, seek bar, etc.) and drag the mouse in a direction (e.g., upward, etc.). The second interaction can be the user using a finger of stylus on a touch interface associated with the content player to click/tap/press the second playback axis and drag the finger/stylus in a direction (e.g., upward, etc.).

At 560, the content player can cause a change in the scale associated with the second playback axis/time-based content item. The content player can cause a decrease in a quantity of time associated with each time window associated with the increments of the scale associate with the second playback axis (e.g., second playback direction, seek bar, etc.). The scale of the second playback axis (e.g., 5-second increments) can be changed based on the second interaction. The scale of the second playback axis can be changed based on a continuous access (e.g., access for a distance, access for a duration, etc.) associated with the second interaction. For example, the scale of the second playback axis can be increased as the duration (e.g., continuous access) associated with the second interaction increases. For example, as the user continues to click the user interface element (or second playback axis) and drag the mouse/finger upwards, the scale of the second playback axis (e.g., seek bar) can increase from 5-second increments to 2-second increments, from 2-second increments to 1-second increments, from 1-second increments to millisecond increments, so on, and the like. If the direction of the interaction changes (e.g., changes to an opposite direction, changes from an upward direction to a downward direction, etc.), then the scale of the second playback axis (e.g., second playback direction, seek bar, etc.) can be decreased. For example, as the user continues to click the user interface element (or second playback axis) and drag the mouse/finger downwards, the scale of the second playback axis (e.g., seek bar) can decrease from millisecond increments to 1-second increments, from 1-second increments to 2-second increments, from 2-second increments to 5-second increments, so on, and the like.

The scale of the second playback axis (e.g., second playback direction, seek bar, etc.) can be adjusted based on an interaction. The second playback axis can be scaled based on a user preference (e.g., 1-second increments, 2-second increments, 5-second increments, etc.), and the seek indicator associated with the second playback axis can be moved in a direction along the second playback axis (e.g., seek bar). Playback of the time-based content item can correspond to the location of the seek indicator along the second playback axis. For example, an indication on the second playback axis can be used to find a playback instance of the time-based content item (e.g., point in a video). Moving the seek indicator to a location along the second playback axis indicated as "1:25" can correspond to playback of the time-based content item starting at a 1 hour and 25 minute duration of the time-based content item. Further, if the seek indicator is moved to a location along the second playback axis indicated as "2:35", then playback of the time-based content item can occur at a 2 hour and 35 minute duration of the time-based content item. Playback of the time-based content item can correspond to any playback instance of the time-based content item indicated on the second playback axis. For example, a user watching video can access the second playback axis and move the seek indicator to a point indicated on the second playback axis (e.g., a 1:25) and the video can start/resume at a point 1 hour and 25 minutes into the video. To start/resume a time-based content item (e.g., video, audio, etc.) at a point indicated on the second playback axis, a device, such as a device configured to display the second playback axis (e.g., a content player, the display device 121, the media device 120, the mobile device 124, etc.) and/or a device configured to cause display of the second playback axis (e.g., a content player, the media device 120, the mobile device 124, etc.) can access a content source (e.g., content source(s) 127, network-based content source, streaming content source, etc.) and/or storage location (e.g., media file, data file, database, digital optical disc, compact disc, etc.) associated with the time-based content item. For example, a user watching a time-based content item (e.g., video) can access the second playback axis (e.g., second playback direction, seek bar, etc.), move the seek indicator to a point indicated on the second playback axis (e.g., a 1:25), and a signal can be generated that causes a content player to associate, request, and/or retrieve one or more manifest files associated with the time-based content item to from a content source. The one or more manifest files can comprise one or more indicators (e.g., metadata, watermarks, etc.) associated with the point indicated on the second playback axis that cause the time-based content item to start/resume at a point 1 hour and 25 minutes into the time-based content. As another example, a user watching a time-based content item (e.g., video) can access the second playback axis, move the seek indicator to a point indicated on the second playback axis (e.g., a 1:25), and a signal can be generated that causes a content player to decode an encoded file associated with the time-based content item. The content player can decode a portion of the encoded file that is associated with the point indicated on the second playback axis (e.g., a 1:25). The file can be associated with the point indicated on the second playback axis via metadata, resource indicators, or any other suitable/similar means. Decoding the portion of the encoded file can cause the time-based content item to start/resume at a point 1 hour and 25 minutes into the time-based content. In an aspect, a time-based content item can start/resume at a point indicated on the second playback axis (e.g., second playback direction, seek bar, etc.) by any known or related method/means.

The content player can determine when the user is no longer accessing the second playback axis (e.g., second playback direction, seek bar, etc.). The content player, based on the determination that the user is no longer accessing the second playback axis, can cause display of the first playback axis (e.g., first playback direction, seek bar, etc.). The content player, based on the determination that the user is no longer accessing the second playback axis, can cause display of the first playback axis for a duration. The duration can be of any length of time (e.g., 1 second, 2 seconds, etc.). During the duration, the first playback axis can be displayed as an overlay in the time-based content item.

Figure 6:
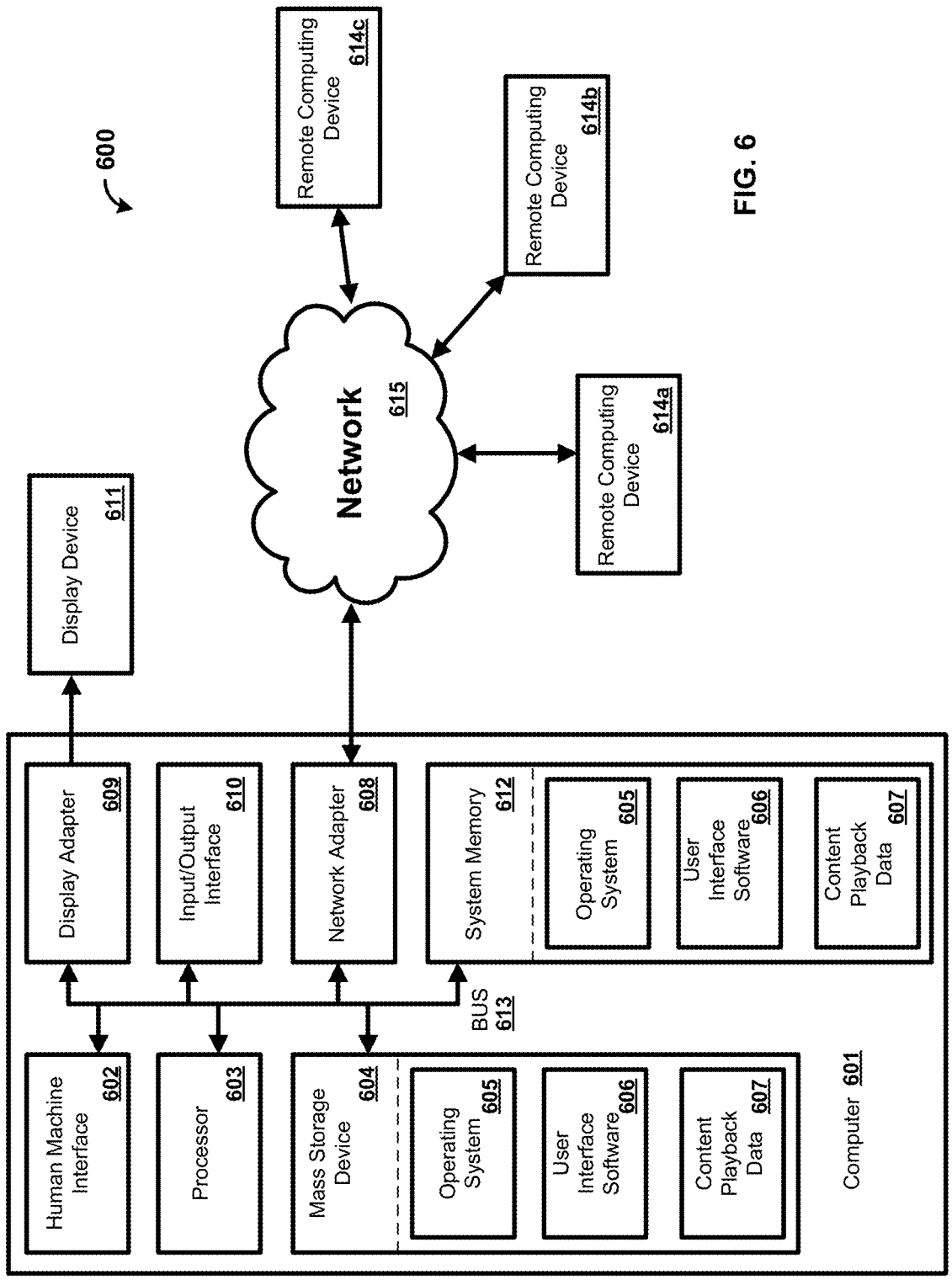
FIG. 6 is a block diagram of an example computing device.

In an exemplary aspect, the methods and systems can be implemented on a computer 601 as illustrated in FIG. 6 and described below. By way of example, the media device 120, and the mobile device 124 of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods herein can be implemented via a general-purpose computing device in the form of a computer 601. The components of the computer 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the one or more processors 603, a mass storage device 604, an operating system 605, user interface software 606, content playback data 607, a network adapter 608, the system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the content playback data 607 and/or program modules such as the operating system 605 and the user interface software 606 that are immediately accessible to and/or are presently operated on by the one or more processors 603.

In another aspect, the computer 601 can also comprise other removable/non-removable, volatile/non-volatile computer storage media. By way of example, FIG. 6 illustrates the mass storage device 604 which can provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the user interface software 606. Each of the operating system 605 and the user interface software 606 (or some combination thereof) can comprise elements of the programming and the user interface software 606. The content playback data 607 can also be stored on the mass storage device 604. The content playback data 607 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, the display device 611 can also be connected to the system bus 613 via an interface, such as the display adapter 609. It is contemplated that the computer 601 can have more than one display adapter 609 and the computer 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the user interface software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
  causing display of a time-based content item;
  receiving a signal indicating a first interaction with a first playback direction associated with the time-based content item, wherein the first interaction comprises an access of the first playback direction;
  causing, based on the first interaction, display of a user interface element;
  receiving a signal, via the user interface element, indicating a second interaction with a second playback direction associated with the time-based content item;
  causing, based on the second interaction, display of a seek indicator at a playback time instance of a plurality of playback time instances of the time-based content item, wherein the plurality of playback time instances are each separated by a time window;
  receiving a signal indicating a third interaction, wherein the third interaction comprises a continuous access of the second playback direction; and causing, based on the third interaction, a decrease in a quantity of time associated with the time window.

2. The method of claim 1, wherein the first playback direction comprises a first playback axis and the second playback direction comprises a second playback axis, wherein a position of the seek indicator along the second playback axis indicates the playback time instance of the plurality of playback time instances.

3. The method of claim 1, wherein each playback time instance of the plurality of playback time instances is associated with a respective indication of a plurality of indications of the second playback direction, wherein a distance between each respective indication of the plurality of indications decreases respective to the decrease in the quantity of time.

4. The method of claim 1, wherein the time-based content item comprises a plurality of segments and each segment of the plurality of segments is associated with the playback time instance of the plurality of playback time instances, wherein a selection of the playback time instance causes a playback of the time-based content item.

5. The method of claim 2, wherein the second playback axis is presented as an overlay in the time-based content item.

6. The method of claim 1, further comprising causing, based on a change associated with the third interaction, an increase in the quantity of time associated with each time window.

7. The method of claim 6, wherein the change associated with the third interaction comprises a change in direction of the third interaction.

8. A method comprising:
   causing display of a first playback direction of a time-based content item;
   receiving a signal indicating a first interaction with the first playback direction, wherein the first interaction comprises an access of the first playback direction;
   causing, based on the first interaction, display of a second playback direction of the time-based content item, wherein the second playback direction comprises a plurality of indications each associated with a playback time instance of a plurality of playback time instances of the time-based content item, wherein the plurality of playback time instances are each separated by a time window;
   receiving a signal indicating a second interaction, wherein the second interaction comprises a continuous access of the second playback direction; and
   causing, based on the continuous access of the second playback direction, a change in a scale associated with the second playback direction.

9. The method of claim 8, wherein the first playback direction comprises a first playback axis and the second playback direction comprises a second playback axis, wherein the change in the scale comprises a decrease in a quantity of time associated with each time window when the access of the second playback direction comprises an upward direction from the first playback axis and an increase in the quantity of time associated with each time window when the access of the second playback direction is downward from the first playback axis.

10. The method of claim 9, wherein a distance between each indication of the plurality of indications decreases respective to the decrease in the quantity of time when the second interaction comprises the upward direction and the distance between each indication of the plurality of indications increases respective to the increase in the quantity of time when the second interaction comprises a downward direction.

11. The method of claim 9, wherein the second playback axis comprises a seek indicator, and wherein a position of the seek indicator along the second playback axis indicates the playback time instance of the plurality of playback time instances.

12. The method of claim 8, wherein the time-based content item comprises a plurality of segments and each segment of the plurality of segments is associated with the playback time instance of the plurality of playback time instances, wherein a selection of the playback time instance causes a playback of the time-based content item.

13. A method comprising:
   causing display of a time-based content item and a first playback direction associated with the time-based content item;
   receiving a signal indicating an access of the first playback direction;
   causing, based on the access, the first playback direction to no longer be displayed;
   causing display of a second playback direction associated with the time-based content item, wherein the second playback direction comprises a plurality of indications each associated with a playback time instance of a plurality of playback time instances of the time-based content item, wherein the plurality of playback time instances are each separated by a time window;
   receiving a signal indicating a continuous access of the second playback direction; and
   causing, based on the continuous access, a change in a scale associated with the second playback direction.

14. The method of claim 13, wherein the first playback direction comprises a first playback axis and the second playback direction comprises a second playback axis, and further comprising:
   determining that the second playback direction is no longer accessed; and
   causing, based on the determination and for a duration, display of the first playback direction.

15. The method of claim 13, wherein the change in the scale comprises a decrease in a quantity of time associated with each time window when a first interaction is in a first direction and an increase in the quantity of time associated with each time window when a second interaction is in a second direction.

16. The method of claim 15, wherein the first direction is opposite the second direction.

17. The method of claim 15, wherein a distance between each indication of the plurality of indications decreases respective to the decrease in the quantity of time based on the first direction of the second interaction and the distance between each indication of the plurality of indications increases respective to the increase in the quantity of time based on the second direction of the second interaction.

18. The method of claim 14, wherein the second playback axis comprises a seek indicator, and wherein a position of the seek indicator along the second playback axis indicates the playback time instance of the plurality of playback time instances.

19. The method of claim 13, wherein the time-based content item comprises a plurality of segments and each segment of the plurality of segments is associated with the playback time instance of the plurality of playback time instances.

20. The method of claim 19, wherein a selection of the playback time instance causes a playback of the time-based content item.

\* \* \* \* \*